Oct. 23, 1962   L. URMENYI   3,059,466
THICKNESS GAUGES
Filed Jan. 12, 1959

INVENTOR
Laszlo Urmenyi

3,059,466
THICKNESS GAUGES
Laszlo Urmenyi, 18 Ernle Road, Wimbledon,
London, England
Filed Jan. 12, 1959, Ser. No. 789,765
11 Claims. (Cl. 73—37.7)

The object of the present invention is to provide a continuous thickness gauge for sheet material, in which the sheet material to be measured is made to pass over a roller the surface of which is used as a datum for the thickness measurement, comprising means to eliminate the influence of dimensional inaccuracies and of eccentric running of the roller on the measurement.

According to the invention the sheet material to be measured is made to pass over a roller, one or more probes, to be called gauging elements, are mounted near the surface of the roller which is used as the datum surface for the measurement, one or more cams are provided which are actuated by the said roller and one or more probes, to be called the correcting elements, are mounted near and are adapted to be actuated by the said cam or cams. The said cam or cams may be preferably adjustable and may consist, according to the invention, of a flexible disc mounted, with suitable spacing, between two solid discs which latter are provided with a number of adjusting screws arranged in oppositely disposed pairs, by which the said flexible disc may be bent to any desired shape.

Any of the known methods of thickness measurement, contacting or non-contacting, may be used in connection with the invention. Whatever the method of measurement, the gauging element or elements provide the uncorrected thickness measurement and the correcting element or elements provide the correction for the inaccuracy and eccentric running of the roller.

The advantage of the invention against known methods, in which the surface of a roller is used as a datum, is that, instead of a very high precision and therefore very expensive roller, a roller of commercial accuracy may be used. A further advantage is that the invention makes the use of rollers of greater length possible than was heretofore practicable, since the difficulty of making high precision rollers increases with length. Yet a further advantage is that, should the roller suffer some deformation due to aging or to inner stresses or due to an accident, by re-adjusting the cams the accuracy of the readings may be easily restored. The accuracy obtainable with this arrangement may be even greater than when using a precision roller, since even the most accurate roller will have a measurable error whilst with a carefully adjusted cam any measurable errors may be compensated.

Figure 1:
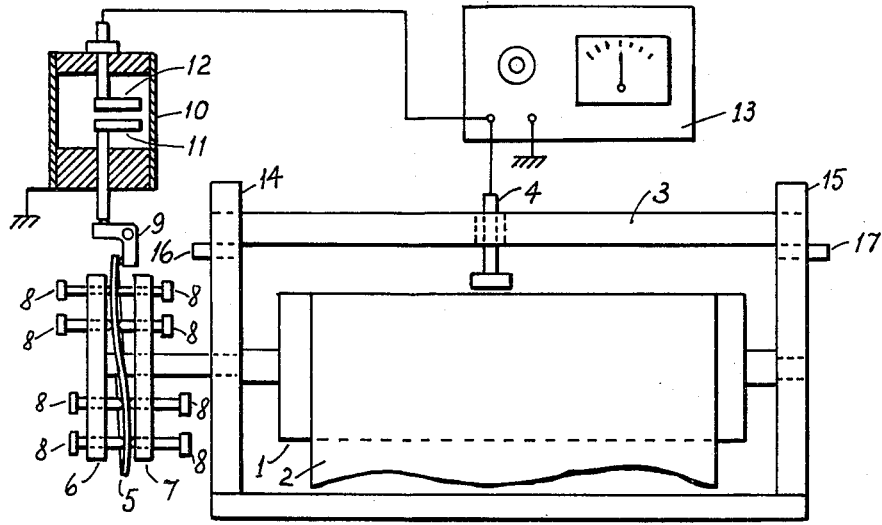
Figure 2:
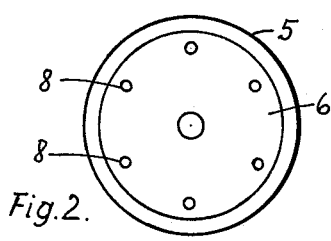
Figure 3:
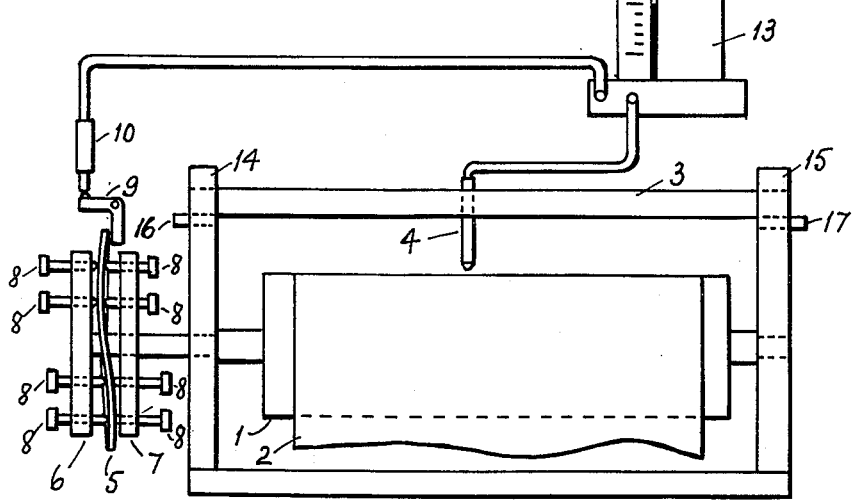

The invention will now be more fully described by the way of examples with reference to the accompanying drawing, in which:

FIG. 1 is an example of the invention when using a capacitance type thickness gauge, FIG. 2 is a side view of the adjustable cam of FIG. 1, FIG. 3 is an example of the invention when using a pneumatic thickness gauge.

Referring to FIG. 1, 1 is the roller, 2 is the sheet material to be measured, 3 is a beam carrying the gauging element 4 which may have a plane surface or may be curved, 5 is a flexible disc being part of an adjustable cam, 6 and 7 are solid discs being also parts of the said adjustable cam, 8 are adjusting screws of the said cam, 9 is a lever, 10 is a variable capacitor of which 11 is one electrode adapted for axial movement to be actuated by the said cam via lever 9, 12 is the other electrode of capacitor 10 arranged so that when rotated about its axis, the capacitance between electrodes 11 and 12 is varied by varying the opposing area without varying the distance between the electrodes, whilst the axial movement of electrode 11 varies the capacitance by varying the distance between the electrodes without varying the opposing area, the capacitances between electrode 4 and roller 1 on the one hand and between electrodes 11 and 12 on the other hand being connected in parallel, and 13 is a thickness measuring instrument based on capacitance measurement. 14 and 15 are guiding pieces which take the beam 3, 16 and 17 are gauge pieces.

FIG. 2 is a side view of the cam. Whilst only 6 pairs of adjusting screws 8 are shown, it will be appreciated that, the more adjusting screws are used, the more accurately can the cam be adjusted.

The operation of this device is slightly different for thickness measurement on insulating and on conducting material. Usually the instrument 13 contains a centre zero meter which reads zero when the capacitance has the nominal value for which the instrument is set and shows deviations to the right or left when the capacitance is greater or smaller than the nominal value, corresponding to changes in thickness of the sheet material. When used for insulating material, the sheet material 2 is first removed, the electrode 4 is set at a convenient distance from the surface of the roller and the instrument 13 is set to read zero. Then the roller is rotated by a small angle, corresponding to the angular distance between the screws. Due to the inaccuracy of the roller and the eccentric running, the distance between electrode 4 and the roller surface and therefore the capacitance of electrode 4 has changed, which is shown on the meter. The screws 8 which are in line with lever 9 are now set so that the capacitor 10 is changed by such an amount that the combined capacitance of electrode 4 and capacitor 10 takes up again the initial value and the meter returns to zero. This setting is repeated with all setting screws 8, every time opposite screws tightened against the disc 5 and against each other. When the setting of all screws is finished, then the meter will show zero in any position of roller 1. When now the sheet 2 is introduced between roller 1 and electrode 4, the capacitance between electrode and roller is increased.

One could now re-set instrument 13 to read zero again, the new setting indicating the thickness of the material. But one would find that the cam correction is not right any more, the meter would show periodic deflections as the roller 1 is rotated and sheet 2 is kept in a fixed position. But re-setting of the cam is not necessary. Rather electrode 12 should be set into a position of increased capacitance. As electrode 12 is slowly rotated whilst the roller 1 is rotated, it will be found that the periodic deviations of the meter decrease in amplitude and at a definite setting of 12 these deviations disappear. The device is now set ready for use and deviations of thickness are shown on the meter unaffected by inaccuracies of the roller.

Alternatively, the gauge pieces 16 and 17 may be replaced by other, thicker gauge pieces to compensate fully or partly for the increase of capacitance by the sheet 2. If one succeeds in restoring the original capacitance by using the right gauge pieces, then no re-setting of instrument 13 or of electrode 12 is necessary. If the capacitance change is only partly compensated, then re-setting of 12 and 13 will be still necessary, but the necessary change in the setting will be smaller and therefore an instrument 13 with a smaller range and a capacitor 10 with a smaller range of setting of electrode 12 will suffice. Electrode 12 may be provided with a calibrated dial, so that the setting may be easily repeated once the correct position on the dial for a certain type of sheet material has been found.

If the device is used for sheet metal or metal foil, the setting is somewhat simpler. In this case, by using gauge pieces 16 and 17, which are exactly, by the nominal thickness of the sheet metal, thicker than the original gauge pieces used for setting with the bare roller, the capacitance between electrode 4 and roller 1 plus the capacitance of capacitor 10 takes up the initial value and no re-setting of 12 or 13 is necessary.

It will be appreciated that, whilst in the drawing only one electrode 4 is shown, any number of electrodes 4 may be used, mounted on beam 3 at convenient positions to measure the thickness simultaneously at various points along the width of the material. Of course, for every electrode 4 a separate cam and variable capacitor are required. The capacitance of capacitor 10 may be connected in series with capacitance of electrode 4 if preferred.

In FIG. 3, 1 is the roller, 2 is the sheet material to be measured, 3 is a beam carrying the gauging element 4, which is in this example a pneumatic jet, 5 is a flexible disc being part of an adjustable cam, 6 and 7 are solid discs being also parts of the said adjustable cam, 8 are adjusting screws of the said cam, 9 is a lever, 10 is a correcting element, which is in this example a pneumatic jet, preferably of the contacting type, 13 is a pneumatic gauging instrument, in the drawing shown as having a water column indicator, but which may have any other conventional indicator and/or recorder, 14 and 15 are guiding pieces which take the beam 3, 16 and 17 are gauge pieces.

The operation of this device is the same for both insulating and conducting materials. The setting is essentially the same as in the previous example in connection with metal foils. The jet 4 is adjusted to a convenient position and, with no sheet material on the roller, the gauging instrument 13 is set to read zero. Then the roller is rotated by a small angle, corresponding to the angular distance between adjoining screws 8 and the screws 8 in line with lever 9 are set so that instrument 13 reads zero again. This adjustment is repeated for all set screws 8 until the instrument 13 reads zero in all positions of the roller. Now the influence of the inaccuracies and eccentric running of roller 1 on the measurement is eliminated. The gauge pieces 16 and 17 are replaced by others, which are, by the nominal thickness of the sheet material to be measured, thicker than the ones used for setting. If now the sheet material is passed over the roller, the instrument 13 will indicate zero when the material has the required nominal thickness, otherwise it will indicate the deviations from the nominal thickness.

In pneumatic gauges a zero adjusting needle valve or other adjustable leakage is usually provided, which in case of single line pneumatic circuits is usually connected in parallel to the measuring jet, in case of differential pneumatic circuits it may be placed in either of the two parallel branches of the circuit. The cam controlled valve or jet in the last example of the invention has essentially a similar function to a zero adjusting control in conventional circuits and may be similarly placed. A separate zero adjusting control may be retained.

The jet 4 may be the non-contacting open type, which is particularly preferred for measurements of very thin films. For heavier materials, when direct contact is not objectionable, the jet 4 may be of the contacting type and may be provided, if required, with a small roller.

Also in this example, as in the previous one, a number of gauging elements 4 may be mounted on beam 3 and as many cams and correcting elements used as gauging elements.

Whilst in the drawing the cam is shown mounted directly on the shaft of roller 1, the cam or cams may actually be mounted on one or more separate shafts and driven by any known means from the roller. The roller 1 may be rotated by the moving sheet material or may be power driven.

What I claim is:

1. Thickness measuring device for sheet materials comprising a roller, at least one adjustable cam adapted to be actuated by the said roller, at least one gauging element mounted near the surface of the roller and at least one variable correcting element mounted near and adapted to be actuated by the said adjustable cam.

2. Device as claimed in claim 1, comprising also a measuring instrument connected to the said gauging element and to the said correcting element and suitable for measuring sheet thickness when the sheet to be measured is passing over the said roller between the said roller and the said gauging element.

3. Device as claimed in claim 1, in which the said adjustable cam consists of a flexible disc and means to adjust the shape of the said flexible disc.

4. Device as claimed in claim 2, in which the said gauging element is a pneumatic gauging element, the said correcting element is a pneumatic variable leakage element and the said measuring instrument is a pneumatic gauging instrument.

5. Device as claimed in claim 4, in which the said pneumatic gauging instrument is of the single line circuit type adapted to measure thickness by means of the said gauging element which is connected in parallel to the said correcting element.

6. Device as claimed in claim 4, in which the said pneumatic gauging instrument is of the kind working on a differential principle, the measuring circuit consisting of two parallel branches of which one branch contains the gauging element and the other branch contains the correcting element.

7. Device as claimed in claim 4, in which the said cam consists of a flexible disc mounted between two solid discs with spacing between the said solid discs and the said flexible disc, the said solid discs containing screws arranged in oppositely disposed pairs, adapted to adjust the shape of the said flexible disc.

8. Device as claimed in claim 2, in which the said gauging element is an insulated electrode having a capacitance between the said electrode and the said roller, the said correcting element is a variable capacitor and the said measuring instrument is a capacitance measuring instrument.

9. Device as claimed in claim 8, in which the said variable capacitor consists of two plane electrodes of which one is adapted to be actuated by the said cam in such a way, that the distance between the said plane electrodes is varied and the other is adapted to be pre-set in such a way, that the area of that portion of one of the said plane electrodes which is in juxtaposition with the other may be varied to any pre-set value within predetermined limits.

10. Device as claimed in claim 9, in which the said variable capacitor is connected in parallel with the said insulated electrode.

11. Device as claimed in claim 8, in which the said cam consists of a flexible disc mounted between two solid discs with spacing between the said solid discs and the said flexible disc, the said solid discs containing screws arranged in oppositely disposed pairs, adapted to adjust the shape of the said flexible disc.

References Cited in the file of this patent

UNITED STATES PATENTS

| | | |
|---|---|---|
| 2,025,562 | Balsiger | Dec. 24, 1935 |
| 2,322,031 | Kuebert | June 15, 1943 |
| 2,345,732 | Davies et al. | Apr. 4, 1944 |
| 2,713,209 | Brown | July 19, 1955 |
| 2,870,403 | Lippke | Jan. 20, 1959 |

FOREIGN PATENTS

| | | |
|---|---|---|
| 649,623 | Germany | Aug. 28, 1937 |